Oct. 11, 1932.  C. P. LITTLEPAGE  1,881,746
FENCE WIRE GRAPPLE
Filed June 26, 1930
Fig. 1.
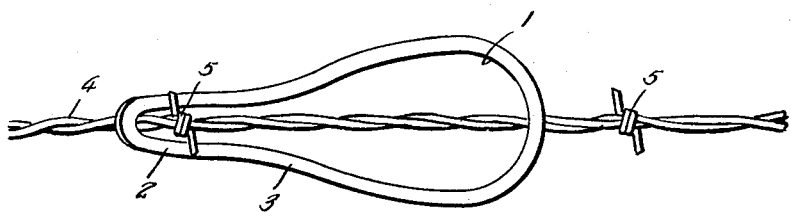
Fig. 2.
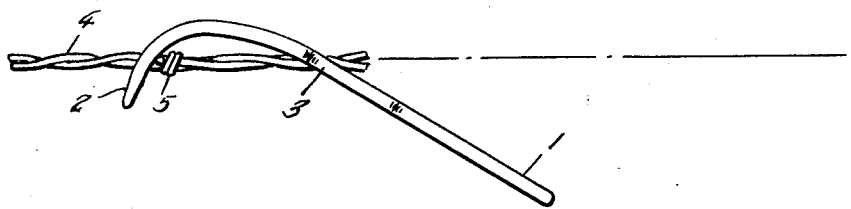
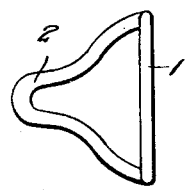
Fig. 3.
Inventor
C. P. Littlepage
By Clarence A. O'Brien
Attorney Patented Oct. 11, 1932

1,881,746

UNITED STATES PATENT OFFICE

CHARLES P. LITTLEPAGE, OF RAMONA, CALIFORNIA

FENCE WIRE GRAPPLE

Application filed June 26, 1930. Serial No. 464,076.

This invention relates to a fence wire grapple particularly for use in stretching barbed wire fences and has for its primary object to provide, in a manner as hereinafter set forth, a grapple of the aforementioned character having no moving parts and which is adapted to be expeditiously mounted on or removed from the wire to be stretched.

Other objects of the invention are to provide a fence wire grapple of the character described which will be comparatively simple in construction, strong, durable, efficient in its use, and which may be manufactured at low cost.

All of the foregoing and still further objects and advantages of the invention may become apparent from a study of the following specification, taken in connection with the accompanying drawing, wherein like characters of reference designate corresponding parts throughout the several views, and wherein:

Figure 1 is a view in front elevation of a fence wire grapple constructed in accordance with this invention, the same being shown engaged with a strand of barbed fence wire.

Figure 2 is a view in side elevation.

Figure 3 is a view in end elevation of the device.

Referring to the drawing in detail, it will be seen that the grapple is formed of a single piece of suitable material and includes an elongated eye 1 from one end of which extends the comparatively narrow loop 2 which, as illustrated to advantage in Figure 2 of the drawing, is longitudinally curved.

The loop 2 merges gradually into the eye 1 as at 3, said eye 1 being substantially straight longitudinally.

The reference numeral 4 designates a portion of a conventional length of barbed fence wire which, of course, has fixed at longitudinally spaced points thereon the barbs 5 which constitute stops or abutments on the grapple when same is in use.

When engaging the grapple on the wire, the device is disposed on said wire in a manner to be engaged by the closed ends of the eye 1 and the loops 2 in which position the longitudinal side portions of the device will be disposed on opposite sides of the wire, said wire being disposed therebetween. The barbs to be engaged for anchoring the device is thus passed through the eye 1 and the grapple is then moved longitudinally along the wire until the barb is engaged by the closed end portion of the loop 2 and the grapple is now ready for use.

When a grapple constructed in accordance with this invention is used for stretching fence wire, said wire will not be damaged nor will the device accidently slip or become disengaged from the wire. When it is desired to remove the grapple, it is only necessary to strike same a light blow with a suitable instrument in a direction reverse to that in which the wire has been stretched.

It is believed that the many advantages of a fence wire grapple constructed in accordance with this invention will be readily understood, and although the preferred embodiment of the invention is as illustrated and described, it is to be understood that changes in the details of construction may be had which will fall within the scope of the invention as claimed.

What is claimed is:

A fence wire grapple comprising a loop-shaped member having one end reduced in width to receive the barb carrying part of a wire, the rest of the member of sufficient width to permit the barbs to pass thru the same, the wide part being substantially straight and the small part being curved at its point of junction with the wide part, whereby the device can have the curved portion straddle a wire, the barb carrying part engaged by the small portion.

In testimony whereof I affix my signature.

CHARLES P. LITTLEPAGE.